United States Patent Office 3,193,560
Patented July 6, 1965

3,193,560
NEW DERIVATIVES OF 2-OXAZOLIDINONE
Gilbert Régnier, Sceaux, Roger Canevari, La Hay les Roses, and Jean-Claude Le Douarec, Versailles, France, assignors to Sóciété en nom Collectif dite: Science Union et Cie, Société Francaise de Recherche Medicale, Suresnes, Seine, France, a French society
No Drawing. Filed Mar. 26, 1964, Ser. No. 355,069
Claims priority, application Great Britain, Mar. 28, 1963, 12,381/63; France, Apr. 4, 1961, 857,672, Patent 1,301,267; July 4, 1961, 866,961, Patent M 1,421
14 Claims. (Cl. 260—307)

The present application is a continuation-in-part of our prior-filed copending application Serial No. 184,926, filed April 4, 1962.

The present invention relates to novel derivatives of 2-oxazolidinone and is more particularly concerned with (a) such basic amino compounds having the general formula:

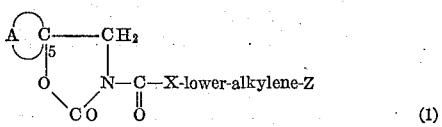

(I)

wherein

A represents the remainder of a polymethylene chain which, together with the 5 carbon atom, constitutes a ring selected from unsubstituted polymethylene rings having four up to a maximum of ten carbon atoms in the ring, unsubstituted hydronaphthalene rings, and polymethylene rings having six carbon atoms in the ring selected from lower-alkylpolymethylene rings, hydroxypolymethylene rings, halopolymethylene rings, lower-alkoxypolymethylene rings, and dilower-alkylpolymethylene rings, X represents a bivalent linkage selected from an oxygen atom and an —NH— group, and Z represents an amine radical selected from diloweralkylamino, pyrrolidino, piperidino, morpholino, piperazino, N-lower-alkylpiperazino, N - piperonylpiperazino, and mono and poly C-lower-alkyl derivatives thereof, and (b) acid addition salts thereof.

In these compounds, the carbon atom in the fifth position (Beilstein's numbering) of the 2-oxazolidinone ring also forms part of a one- or two-ring polymethylene chain, which may or may not include an ethylenic double bond and/or various substituents selected from halogen, hydroxyl, lower-alkyl, and lower-alkoxy groups.

By way of more specific illustration:

(1) If the polymethylene ring is unsubstituted, A plus the 5 carbon atom corresponds to cyclobutane, cyclopentane, cyclohexane, cycloheptane, cyclooctane, cyclononane, and cyclodecane, respectively, in the above formula, (2) If the polymethylene ring is substituted, A plus the 5 carbon atom corresponds to cyclohexane in the above formula.

The positions of the various substituents is determined with respect to the carbon atom common to both rings, in the various substitutions illustratively indicated below:

(a) The cyclohexane ring is substituted in the 2-, 3-, or 4-position with a halogen atom such as F, Cl or Br, a hydroxyl radical —OH, a lower-alkyl radical, preferably having a maximum of five carbon atoms, of straight or branched-chain structure, such as methyl, ethyl, propyl, isopropyl, butyl, isobutyl, amyl, or the like, or a lower-alkoxy group, preferably having a maximum of five carbon atoms, of straight or branched-chain structure, such as methoxy, ethoxy, propoxy, isopropoxy, butoxy, amyloxy, or the like.

(b) The cyclohexane ring is substituted with two lower-alkyl radicals, preferably methyl radicals, twinned at the same, e.g., the 2 or 3, position.

(c) The cyclohexane ring is twice substituted, as at the 3- and 5-positions, with two lower-alkyl groups, preferably methyl groups.

(d) The cyclohexane ring is substituted, as at the 2- and 3-positions or at the 3- and 4-positions, with two lower-alkyl radicals, preferably methyl radicals. A special instance of the last-mentioned two substitutions is the case where the two adjacent radicals form part of a polymethylene chain having four carbon atoms, equivalent to decahydronaphthalene wherein the carbon atom common to the oxazolidinone ring may be in either the α or β position of the hydronaphthalene ring.

It is to be understood that in respect to those of the compounds of the general formula given above, wherein the polymethylene ring is branched due to substitution, such compounds will exist in two alternative forms, arbitrarily designated herein as the α-form and the β-form, characterizing either one of the cis and trans configurations. Such isomeric compounds are included within the purview of the present invention.

Returning to the general formula given above:

(3) X represents an oxygen atom or a —NH— group.

Z represents an amine radical selected from diloweralkylamine radicals such as —N(CH$_3$)$_2$, —N(C$_2$H$_5$)$_2$,

—N(C$_3$H$_7$)$_2$, —N(C$_4$H$_9$)$_2$ pyrrolidino, piperidino, morpholino, piperazino, N-lower-alkylpiperazino, piperonylpiperazino, and mono and poly C-lower-alkyl, e.g., methyl, derivatives thereof, or the like. The 2-oxazolidinone derivatives of the invention can be prepared by reacting an acid halide, preferably the acid chloride, of either the (α) or (β) form as defined above, when such exist, and of the general formula:

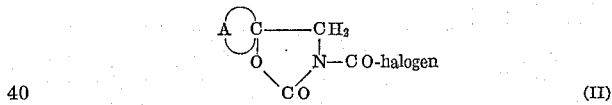

(II)

with an aminoalkyl compound of the general formula:

HX-lower-alkylene-Z    (III)

wherein A, X, and Z have the meanings previously assigned, wherein lower-alkylene preferably has two carbon atoms and Z preferably is dilower-alkylamino wherein the lower-alkyl groups each preferably contain a maximum of four carbon atoms.

It is advantageous to carry out the reaction in the presence of a solvent, which may illustratively be an aromatic hydrocarbon such as benzene, or an aliphatic or heterocyclic ether such as tetrahydrofurane, and preferably in the presence of an excess of the HX-lower-alkylene-Z compound or of a tertiary base, such as triethylamine or other tertiary amine, pyridine or the like, serving as a hydrogen halide acceptor.

It has also been found advantageous to add to a solution of the selected HX-lower-alkylene-Z compound in the selected solvent, which may or may not contain any of the above mentioned tertiary bases, the acid chloride dissolved in the same solvent. The reaction is preferably carried out at a moderate temperature in the range from ambient, about 20° C., to about 70° C.

The novel 2-oxazolidinone derivatives, which are strong bases, can be purified by physical methods such as crystallization, chromatography, or the like, or chemical methods including the formation of salts with inorganic or organic acids, crystallization of the salts from a suitable solvent, and decomposition in an alkaline medium. In such operations, the nature of the anion is immaterial provided it leads to a well-defined and readily crystallizable salt. Such bases may generally be advantageously preserved in the form of addition salts thereof.

As addition salts with inorganic acids may be mentioned the hydrochloride, hydrobromide, sulfate, phosphate, methane-sulfonate; with organic acids, the acetate, propionate, maleate, fumarate, succinate, benzoate, tartrate, malate, and oxalate.

The compounds which form the subject of this invention are of interest to the chemical industry as synthetic chemical intermediates, and also as basic products in the pharmaceutical industry. The compounds of the invention also possess activity as analgesics and anti-inflammatory agents and can be employed in the treatment of pain and inflammatory syndromes. They have relatively low toxicity and relatively high therapeutic ratios.

Some of the compounds of the invention have outstanding activity along the lines indicated. For example, the $LD_{50}$ of the compounds was studied and determined in mice by the intraperitoneal route. It was found that it is as great as 1500 mg./kg. for some of the compounds tested. The analgesic activity was demonstrated by the hot plate test of Woolf and McDonald. It was found that the compounds when administered intraperitoneally, at a dosage level of 50 to 200 mg./kg., increase by 2 to 3 times the threshold of pain-perception of animals in comparison with untreated animals.

Anti-inflammatory properties of the compounds have also been studied on plantar oedema of the rat's paw induced by subaponevrotic injection of kaolin. The product was administered per-orally in 5 doses of 100 mg./kg. over a 48-hour period. The compounds of the invention inhibit oedema at 25 to 40% of those untreated.

In human and veterinary therapy the compounds may be employed by oral, rectal, or parenteral routes in dosages varying from about 50 to 500 mg. per day, preferably together with a pharmaceutically acceptable carrier in the form of capsules, tablets, suppositories, solutions, suspensions, or the like, for the treatment of arthritis, neuritis, trauma, post-operative pain, and related and similar conditions.

The following examples, given by way of illustration only and not by way of limitation, will provide a clear understanding of the manner in which the invention can be performed. All melting points indicated were determined with the Kofler block. Yields are given with respect to the starting acid chloride.

*Example 1*

Spiro[1',5 - (cycloheptane)(3 - dimethylaminoethoxycarbonyl-2-oxazolidinone)].

To a solution of 14.5 grams of the chloride of spiro [(1',5-cycloheptane)(2-oxo - 3 - oxazolidinyl)]carboxylic acid, dissolved in 300 ml. of anhydrous benzene, there are added dropwise over a period of twenty minutes, at a temperature of ten degrees centigrade, 11.2 grams of dimethylaminoethanol in thirty ml. of benzene.

After the addition is complete, the temperature is allowed to rise to 23° C., during which time a slight precipitate forms. The mixture is allowed to stand with agitation for two hours, then without agitation at the laboratory temperature for 24 hours. At the end of this time 100 ml. of water are added, and the benzenic portion poured off. This portion is extracted with several batches of ten percent hydrochloric acid and the acidic extracted batches alkalized with potassium carbonate. After several extractions with ether and drying of the ether extracts over anhydrous potassium carbonate, the solvent is evaporated under reduced pressure at a temperature of about forty degrees centigrade. Fifteen grams of the crude oily base is thus obtained.

By adding dry hydrochloric acid to the base in an anhydrous ethanol solution, there are obtained fifteen grams of the hydrochloride, melting at 205 degrees centigrade. The yield is 72%.

The starting acid chloride is stored in a benzene solution and is not isolated. It is prepared by reacting an excess of phosgene with the sodium derivative of spiro 1',5-(cycloheptane) (2-oxazolidinone), M.P. 93° C., prepared in turn by the method disclosed by Newman and Kutner, J. Am. Chem. Soc. 73, 4202 (1961).

The compound spiro [1',5-(cycloheptane) (3-dimethylaminopropoxycarbonyl-2-oxazolidinone)] is prepared by substituting the dimethylaminopropanol for the dimethylaminoethanol used in the foregoing example.

*Example 2*

Spiro [1',5-(2'-chlorocyclohexane) (3-dimethylaminoethoxycarbonyl-2-oxazolidinone)].

This compound is prepared as in Example 1 with a yield of 55%. The corresponding hydrochloride has a melting point of 215° C. when crystallized from ethanol. The starting acid chloride, not isolated, is prepared as in Example 1 from spiro 1',5-(2'-chlorocyclohexane) (2-oxazolidinone), M.P. 150° C., prepared in turn by a nucleization reaction of phosgene in the presence of potassium hydroxide, with 1-aminomethyl-2-chloro-1-cyclohexanol (hydrochloride melting point 186° C.), in turn prepared by catalytic reduction of 2-chloro-1-nitromethyl-1-cyclohexanol (B.P. at 1.5 mm. Hg=115–119° C., $n_D^{25}$=1.5030).

*Example 3*

Spiro [1',5-(4'-methoxycyclohexane) (3-dimethylaminoethoxycarbonyl-2-oxazolidinone)].

This compound is prepared as in Example 1 with a 42% yield. The acid fumarate melts at 144° C.

The starting acid chloride, not isolated, is prepared from spiro [1',5-(4'-methoxycyclohexane) (2-oxazolidinone)], M.P. 135° C., prepared in turn by Curtius degradation of 2-(4'-methoxy-1'-hydroxy-1'-cyclohexyl)acetohydrazide, melting at 86° C., itself prepared from ethyl (4'-methoxy-1'-hydroxy-1'-cyclohexyl)acetate (B.P. at 0.4 mm. Hg=92–98° C., $n_D^{25}$=1.4623), prepared by Reformatsky's reaction with 4-methoxycyclohexanone.

The corresponding 4'-hydroxycyclohexane compound is prepared in the same manner from the appropriate starting acid chloride.

*Example 4*

Spiro [1',5-(2'-methoxycyclohexane) (3-dimethylaminoethoxycarbonyl-2-oxazolidinone)].

This compound is prepared as in Example 1 with 40% yield. The corresponding acid fumarate melts at 160° C.

The starting compounds are prepared in the manner of Example 3 from ethyl (2'-methoxy-1'-hydroxy-1'-cyclohexyl) acetate (B.P. at 0.5 mm. Hg=80–85° C., $n_D^{20}$=1.4598).

*Example 5*

Spiro [1',5-(2'-methylcyclohexane) (3-dimethylaminoethoxycarbonyl-2-oxazolidinone)]; α-form.

This compound is prepared as in Example 1 with a 67% yield. The corresponding hydrochloride melts at 207° C.

The starting compounds are prepared in the manner of Example 3. The starting acid chloride is not isolated.

Spiro 1',5-(2'-methylcyclohexane) (2-oxazolidinone), M.P. 110° C.; α-form.

Ethyl (2' - methyl - 1' - hydroxy - 1'-cyclohexyl)acetate (B.P. at 6 mm. Hg=105–107° C., $n_D^{25}$=1.4588).

*Example 6*

Spiro [1',5-(4'-methylcyclohexane) (3-dimethylaminoethoxycarbonyl-2-oxazolidinone)]; α-form.

This compound is prepared as in Example 1 with 89% yield. The acid fumarate melts at 161° C.

The starting compounds are prepared in the manner of Example 3. The starting acid chloride is not isolated.

Spiro 1',5-(4'-methylcyclohexane) (2-oxazolidinone), M.P. 131° C.; α-form. (4'-methyl-1'-hydroxy-1'-cyclohexyl) acetylhydrazide, M.P. 121° C.

Ethyl (4'-methyl-1'-hydroxy-1'-cyclohexyl)acetate, B.P. at 8 mm. Hg=112–116° C., $n_D^{25}$=1.4552.

Example 7

Spiro [1',5-(3'-methylcyclohexane) (3-dimethylaminoethoxycarbonyl-2-oxazolidinone)]; α-form.

Prepared as in Example 1 with 61% yield. The acid fumarate melts at 151–152° C.

The starting compounds are prepared in the manner of Example 3. The starting acid chloride is not isolated.

Spiro [1',5-(3'-methylcyclohexane) (2-oxazolidinone)], M.P. 118–120° C.; α-form. The compound (α-form) is separated from the β-form by fractional crystallization from petroleum ether.

(3'-methyl-1'-hydroxy-1'-cyclohexyl)acetohydrazide, M.P. 76° C.

Ethyl (3'-methyl-1'-hydroxy-1'-cyclohexyl)acetate, B.P. at 6 mm. Hg=109–113° C., $n_D^{19}$=1.4569.

Example 8

Spiro [1',5-(3'-methylcyclohexane) (3-dimethylaminoethoxycarbonyl-2-oxazolidinone)]; β-form.

Prepared as in Example 1 with 50% yield. The fumarate melts at 144–146° C.

The starting acid chloride is not isolated.

Spiro [1',5-(3'-methylcyclohexane) (2-oxazolidinone)], M.P. 53–55° C.; β-form.

Example 9

Spiro [1',5-(3-methylcyclohexane) (3-diethylaminoethoxycarbonyl-2-oxazolidinone)]; α-form.

Prepared as in Example 1 from diethylaminoethanol with 56% yield. The fumarate melts at 120° C., with decomposition.

Example 10

Spiro [1',5-(3'-methylcyclohexane) (3-dimethylaminoethylcarbamido-2-oxazolidinone)]; α-form.

Prepared as in Example 1 from dimethylaminoethylamine with 34% yield.

The acid fumarate melts at 158° C.

Example 11

Spiro [1',5-(cyclooctane) (3-dimethylaminoethoxycarbonyl-2-oxazolidinone)].

Prepared as in Example 1 with 70% yield. The acid fumarate melts at 142–144° C.

The starting acid chloride is not isolated.

Spiro 1',5 - (cyclooctane) (2 - oxazolidinone), M.P. 127° C.

(1'-hydroxy-1'-cyclooctyl)acetohydrazide, M.P. 81° C.

Ethyl (1'-hydroxy-1'-cyclooctyl)acetate, B.P. at 4 mm. Hg=121–125° C., $n_D^{25}$=1.4718.

Example 12

Spiro [1',5-(cis 3',5'-dimethylcyclohexane) (3-dimethylaminoethoxycarbonyl-2-oxazolidinone)]; α-form.

Prepared as in Example 1 with a 82% yield. The acid fumarate melts at 104° C., then 167° C. due to a change in crystalline phase. The starting acid chloride is not isolated.

Spiro 1',5-(cis-3',5'-dimethylcyclohexane) (2-oxazolidinone); α-form, M.P. 120° C.

(Cis 3',5'-cis-dimethyl-1'-hydroxy-1'-cyclohexyl) acetohydrazide, M.P. 114° C.

Ethyl (3',5'-cis-dimethyl-1'-hydroxy-1'-cyclohexyl) acetate, B.P. at 0.75 mm. Hg=89° C., $n_D^{20}$=1.4535.

Example 13

Spiro [1',5 - (3',4' - dimethylcyclohexane) (3-dimethylaminoethoxycarbonyl-2-oxazolidinone)].

This compound is prepared as in Example 1 with a 75% yield. The acid fumarate melts at 149° C.

Spiro 1',5-(3',4' - dimethylcyclohexane) (2-oxazolidinone), M.P. 103° C.

3',4'-dimethyl - 1' - hydroxy-1'-cyclohexyl)acetohydrazide (an oil).

Ethyl (3',4'-dimethyl - 1' - hydroxy-1'-cyclohexyl)acetate, B.P. at 0.1 mm. Hg=85–94° C., $n_D^{25}$=1.4580.

Example 14

Spiro [1',5 - (3' - ethylcyclohexane) (3-dimethylaminoethoxycarbonyl-2-oxazolidinone)]; α-form.

Prepared as in Example 1 with a 75.4% yield. The acid fumarate melts at 150° C. The starting acid chloride is not isolated.

Spiro [1',5-(3'-ethylcyclohexane) (2 - oxazolidinone)]; α-form, M.P. 109° C.

(3' - ethyl-1'-hydroxy - 1' - cyclohexyl)acetohydrazide (oil).

Ethyl (3'-ethyl-1'-hydroxy-1'-cyclohexyl)acetate, B.P. at 6 mm. Hg=123–126° C., $n_D^{20}$=1.4582.

Example 15

Spiro [1',5 - (3',3' - dimethylcyclohexane) (3-dimethylaminoethoxycarbonyl-2-oxazolidinone)]

Prepared as in Example 1 with a 72.5% yield. The acid fumarate melts at 163° C. The starting acid chloride is not isolated.

Spiro [1',5'-(3',3' - dimethylcyclohexane) (2-oxazolidinone)]; M.P. 148° C.

(3',3' - dimethyl-1'-hydroxy-1'-cyclohexyl)acetohydrazide (oil).

Ethyl (3',3'-dimethyl - 1' - hydroxy-1'-cyclohexyl)acetate, B.P. at 1 mm. Hg=88–92° C.

Example 16

Trans spiro [2',5 - (decahydronaphthyl) (3 - dimethylaminoethoxycarbonyl-2-oxazolidinone)]; α-form.

Prepared as in Example 1 with a 25% yield. The hydrochloride melts at 196–198° C. The starting acid chloride is not isolated.

Trans spiro [2',5 - (decahydronaphthyl) (2 - oxazolidinone)]; α-form, M.P. 200° C. (from isopropanol); β-form, M.P. 165° C. (from ethyl acetate).

Trans (2-hydroxy - 2 - decahydronaphthyl)acetohydrazide, M.P. 107° C.

Trans (2 - hydroxy-2-decahydronaphthyl)ethyl acetate, B.P. at 7 mm. Hg=153–154° C., $n_D^{17}$=1.4820.

Example 17

Trans spiro [2',5 - (decahydronaphthyl) (3 - dimethylaminoethoxycarbonyl-2-oxazolidinone)]; β-form.

Prepared as in Example 1, with a 60% yield. The acid fumarate melts at 148° C.

Example 18

Cis spiro [2',5-(decahydronaphthyl) (3-dimethylaminoethoxycarbonyl-2-oxazolidinone)]; α-form.

Prepared as in Example 1 with a 76.7% yield. The corresponding acid fumarate melts at 154° C. The starting acid chloride was not isolated.

Cis spiro [2',5 - (decahydronaphthyl) (2 - oxazolidinone)]; α-form, M.P. 140° C. (from ethyl acetate); β-form, M.P. 207° C. (from isopropanol).

Cis (2'-hydroxy - 2' - decahydronaphthyl)acetohydrazide, M.P. 83° C.; cis (2'-hydroxy-2'-decahydronaphthyl)ethyl acetate, B.P. at 7 mm. Hg=161–164° C., $n_D^{17}$=1.4865.

Example 19

Cis spiro [2',5-(decahydronaphthyl) (3-dimethylaminoethoxycarbonyl-2-oxazolidinone)]; β-form.

Prepared as in Example 1 with a 49% yield. The hydrochloride melts at 176° C., then 185° C.

The corresponding tetrahydronaphthyl and hexahydronaphthyl compounds are prepared in the same manner from the appropriate spiro tetrahydronaphthyl and hexahydronaphthyl substituted compounds.

Example 20

Spiro [1',5 - (cycloheptane) (3 - pyrrolidinoethoxycarbonyl-2-oxazolidinone)].

This compound is prepared in the manner of Example 1 from the acid chloride or bromide using pyrrolidinoethanol instead of dimethylaminoethanol.

The corresponding monomethylpyrrolidino, polymethylpyrrolidino, piperidino, morpholino, piperazino, N-lower-alkylpiperazino, e.g., N-methylpiperazino, N-piperonylpiperazino, and mono and poly lower-alkyl derivatives thereof, are prepared in the same manner starting in each case with the appropriate amino-substituted lower-alkanol.

*Example 21*

Spiro [1',5-(cyclohexane)(3-dimethylaminoethoxycarbonyl-2-oxazolidinone)].

This compound, otherwise known as dimethylaminoethyl (2-oxo-5,5-pentamethylene-3-oxazolidinyl)carboxylate, is prepared in the manner of Example 1 using the chloride or bromide of spiro [1',5-cyclohexane)(2-oxo-3-oxazolidinyl)]carboxylic acid; the hydrochloric melts at 208° C. (with decomposition).

The corresponding 1',5-cyclopentane and 1',5-cyclobutane compounds are prepared in the same manner from the correspondingly substituted starting acid.

The compounds of this example have the same activities and uses as given previously for the other compounds disclosed and claimed in this application.

Where the foregoing examples produce a compound having a methyl or other lower-alkyl group, it is to be understood that compounds containing other lower-alkyl groups of straight or branched nature and containing up to eight carbon atoms inclusive, preferably up to a maximum of five carbon atoms, such as methyl, ethyl, propyl, isopropyl, butyl, sec. butyl, t. butyl, amyl, isoamyl, hexyl, heptyl, and octyl, are prepared in the same manner by substitution in the process of the appropriate different lower-alkyl starting material. Lower-alkylene groups in the compounds thus produced may contain up to a maximum of eight carbon atoms, preferably only two carbon atoms, may be varied in the same manner, and may be, for example, ethylene, propylene, butylene, isobutylene, amylene, isoamylene, hexylene, heptylene, octylene, or the like. Likewise, where chloro or other halogen atom is present, although chlorine is preferred, further halogen compounds including iodo, bromo, chloro, and fluoro compounds are prepared starting from the appropriate halogenated starting material. Similarly, where methoxy or other lower-alkoxy group is present, other lower-alkoxy groups containing various lower-alkyl groups having up to eight carbon atoms inclusive, preferably up to a maximum of five carbon atoms, are prepared in same manner from the appropriate different lower-alkoxy starting material. Moreover, when one dilower-alkylamino group, such as the dimethylamino group, is present in a compound, other dilower-alkylamino compounds are prepared in the same manner starting only with the selected different dilower-alkylamino compound. In the same manner, ortho or meta substituted compounds are produced instead of the para, and vice versa, by utilizing the selected appropriately substituted starting compound. Similarly, other molecular changes are readily made.

The compounds of the invention are generally characterized by the pharmacological activity hereinbefore stated, indicative of their use in counteracting certain physiological abnormalities in an animal body. This activity of the active agents of the present invention, as evidenced by tests in lower animals, is indicative of utility in human beings as well as in lower animals. Clinical evaluation in human beings has not been completed. It will be clearly understood that the distribution and marketing of any compound or composition falling within the scope of the present invention for use in human beings will of course have to be predicated upon prior approval by governmental agencies, such as the U.S. Federal Food and Drug Administration, which are responsible for and authorized to pass judgment on such questions.

Effective quantities of the pharmacologically active compounds of the invention may be administered to a living animal body in any one of various ways, for example, orally as in capsules or tablets, or parenterally in the form of sterile solutions or suspensions. Additional modes of administration are intrarectally and buccally. Other usual modes of administration may be employed. Oral administration is preferred. The free basic amino compounds, while effective, are preferably formulated and administered in the form of their non-toxic acid-addition salts for usual reasons, such as convenience of crystallization, increased solubility, and the like.

Pharmaceutical formulations are usually prepared from a predetermined quantity of one or more of the compounds of the invention, generally in the form of a non-toxic salt, preferably in solid form. Such formulations may take the form of powders, elixirs, solutions, pills, capsules, or tablets, with or without, but preferably with, any one of a large variety of pharmaceutically acceptable vehicles or carriers. When in admixture with a pharmaceutical vehicle or carrier, the active ingredient usually comprises from about 0.01 to about 75 percent, normally from about 0.05 to about 15 percent, by weight of the composition. Carriers such as starch, sugar, talc, commonly used synthetic and natural gums, water, and the like, may be used in such formulations. Binders such as gelatin, and lubricants such as sodium stearate, may be used to form tablets. Disintegrating agents such as sodium bicarbonate may also be included in tablets.

Although relatively small quantities of the active materials of the invention, even as little as 0.1 milligram, may be used for minor therapy or in cases of administration to subjects having a relatively low body weight, unit dosages are usually five milligrams or above and preferably twenty-five, fifty, or one-hundred milligrams or even higher, depending of course upon the subject treated and the particular result desired. Usual broader ranges appear to be one to 100 milligrams per unit dose, with a daily dosage regimen of 50–500, preferably 50–200, milligrams. The active agents of the invention may be combined for administration with other pharmacologically active agents, such as analgesics, sedatives, tranquilizers, other anti-inflammatory agents, anti-infectious agents, adrenal or progestational or estrogenic steroids or hormones, or the like, or with buffers, antacids or the like, and the proportion of the active agent or agents in the compositions may be varied widely. It is only necessary that the active ingredient of the invention constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to established medical principles under the direction of a physician or veterinarian.

As previously stated, the compounds of the invention are most conveniently employed in the form of non-toxic acid-addition salts. Such salts also have improved water-solubility. Although the non-toxic salts are preferred, any salt may be prepared for use as a chemical intermediate, as in the preparation of another but non-toxic acid-addition salt. The free basic compounds may be conveniently converted to their acid addition salts by reaction of the free base with the selected acid, preferably in the presence of an organic solvent inert to the reactants and reaction products under the conditions of the reaction. The acids which can be used to prepare the preferred non-toxic acid addition salts are those which produce, when combined with the free bases, salts the anions of which are relatively innocuous to the animal organism in therapeutic doses of the salts, so that beneficial physiological properties inherent in the free bases are not viatied by side-effects ascribable to the anions.

Appropriate acid-addition salts are those derived from mineral acids such as hydrochloric acid, hydrobromic acid, hydroiodic acid, nitric acid, sulfuric acid, and phosphoric acid; and organic acids such as acetic acid, citric acid, lactic acid, fumaric acid, and tartaric aid. The preferred acid addition salts are the hydrochlorides and fumarates.

The acid-addition salts are prepared either by dissolving the free base in an aqueous solution containing the appropriate acid and isolating the salt by evaporating the solution, or by reacting the free base and the selected acid in an organic solvent, in which case the salt ordinarily separates directly or can be conventionally recovered by concentration of the solution or the like. Conversely the free base may be obtained conventionally by neutralizing the acid-addition salt with an appropriate base such as ammonia, ammonium hydroxide, sodium carbonate or the like, extracting the liberated base with a suitable solvent, illustratively ethyl acetate or benzene, drying the extract and evaporating to dryness, or in other conventional manner.

When there are two or more basic nitrogen atoms present in the compounds of the invention, poly-acid-addition salts may be obtained by employing the proper increased molar ratios of acid to the free base.

It is to be understood that the invention is not to be limited to the exact details of operation or exact compounds, compositions, or procedure shown and described, as obvious modifications and equivalents will be apparent to one skilled in the art, and the invention is therefore to be limited only by the scope of the appended claims.

We claim:
1. A compound selected from the group consisting of
(a) 2-oxazolidinones having the following general formula:

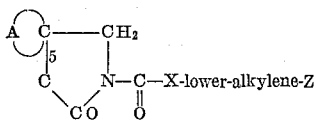

wherein the carbon atom in the 5 position of the 2-oxazolidinone ring also forms part of a polymethylene chain, wherein A represents the remainder of the polymethylene chain which, together with the 5 carbon atoms, constitutes a polymethylene ring selected from the group consisting of unsubstituted polymethylene rings having four up to a maximum of ten carbon atoms in the ring, an unsubstituted hydronaphthalene ring, and a polymethylene ring having six carbon atoms in the ring selected from the group consisting of lower-alkyl polymethylene rings, hydroxypolymethylene rings, halopolymethylene rings, lower-alkoxy polymethylene rings, and dilower-alkyl polymethylene rings, and α and β forms thereof X represents a bivalent linkage selected from the group consisting of an oxygen atom and an —NH— group, and Z represents an amine radical selected from the group consisting of dilower-alkylamino, pyrrolidino, piperidino, morpholino, piperazino, N-lower-alkyl piperazino, N-piperonylpiperazino, and C-lower-alkyl derivatives thereof, and (b) pharmaceutically acceptable acid addition salts thereof.

2. The compound spiro [1',5-(3'-methylcyclohexane) (3-dimethylaminoethoxycarbonyl-2-oxazolidinone)].

3. The compound spiro [1',5-(3'-methylcyclohexane) (3-diethylaminoethoxycarbonyl-2-oxazolidinone)].

4. The compound spiro [1',5-(3-methylcyclohexane) (3-dimethylaminoethylcarbamido-2-oxazolidinone)].

5. The compound spiro [1',5-(3'-ethylcyclohexane) (3-dimethylamonoethoxycarbonyl-2-oxazolidinone)].

6. The compound spiro [1',5-(2'-chlorocyclohexane) (3-dimethylaminoethoxycarbonyl-2-oxazolidinone)].

7. The compound spiro [1',5-(2-methoxycyclohexane) (3-dimethylaminoethoxycarbonyl-2-oxazolidinone)].

8. The compound spiro [1',5-(3',5'-dimethylcyclohexane) (3 - dimethylaminoethoxycarbonyl - 2 - oxazolidinone)].

9. The compound spiro [1',5-(3'-3'-dimethylcyclohexane) (3 - dimethylaminoethoxycarbonyl - 2 - oxazolidinone)].

10. The compound spiro [1',5-(cycloheptane) (3-dimethylaminoethoxycarbonyl-2-oxazolidinone)].

11. The compound spiro [1',5-(cyclooctane) (3-dimethylaminoethoxycarbonyl-2-oxazolidinone)].

12. The compound spiro cis [2',5-(decahydronaphthyl) (3 - dimethylaminoethoxycarbonyl - 2 - oxazolidinone)].

13. The compound spiro trans [2'-5-(decahydronaphthyl) (3 - dimethylaminoethoxycarbonyl - 2 - oxazolidinone)].

14. Spiro [1'5-(cyclohexane) (3-dimethylaminoethoxycarbonyl-2-oxazolidinone)].

References Cited by the Examiner

UNITED STATES PATENTS

| | | | |
|---|---|---|---|
| 3,006,812 | 10/61 | Wallace | 167—65 |
| 3,047,462 | 7/62 | Maillard et al. | 167—65 |
| 3,119,833 | 1/64 | Sovish | 260—307 |
| 3,133,932 | 5/64 | Horn et al. | 260—307 |

NICHOLAS S. RIZZO, *Primary Examiner.*

UNITED STATES PATENT OFFICE
CERTIFICATE OF CORRECTION

Patent No. 3,193,560                          July 6, 1965

Gilbert Régnier et al.

It is hereby certified that error appears in the above numbered patent requiring correction and that the said Letters Patent should read as corrected below.

Column 5, line 27, for "-(3-methylcyclohexane)" read -- -(3′-methylcyclohexane) --; line 72, for "3′,4′-dimethyl-" read -- (3′,4′-dimethyl- --; column 8, line 71, for "viatied" read -- vitiated --; column 9, line 1, for "aid" read -- acid --; lines 32 to 36, for that portion of the formula reading

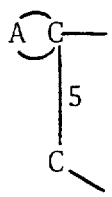          read          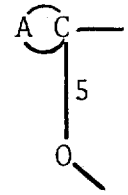

column 10, line 16, for "-(3-" read -- -(3′- --; line 19, for "(3-dimethylamonoethoxycarbonyl-" read -- (3-dimethylaminoethoxycarbonyl- --; line 22, for "-(2-" read -- -(2′- --; line 27, for "-(3′-3′-" read -- (3′,3′- --; line 37, for "[2′-5-" read -- [2′,5- --; same column 10, line 40, for "[1′5-" read -- [1′,5- --.

Signed and sealed this 29th day of March 1966.

(SEAL)
Attest:

ERNEST W. SWIDER                      EDWARD J. BRENNER
Attesting Officer                   Commissioner of Patents